United States Patent [19]
Wafer et al.

[11] Patent Number: 5,221,063
[45] Date of Patent: Jun. 22, 1993

[54] SELECTIVE DOUBLE BACKSEAT FOR VALVE STEMS

[75] Inventors: Don B. Wafer, Spring; Michael R. Williams, Houston, both of Tex.

[73] Assignee: FMC Corporation, Chicago, Ill.

[21] Appl. No.: 876,609

[22] Filed: Apr. 30, 1992

[51] Int. Cl.⁵ ............... F16K 41/04; F16K 41/14
[52] U.S. Cl. .................................. 251/330; 251/214
[58] Field of Search ........................ 251/330, 214

[56] References Cited

U.S. PATENT DOCUMENTS

| | | | |
|---|---|---|---|
| 4,082,105 | 4/1978 | Allen | 251/214 X |
| 4,373,700 | 2/1983 | Buchta | 251/330 X |
| 4,527,806 | 7/1985 | Ungchusri et al. | |
| 4,585,210 | 4/1986 | Adams | 251/214 |

Primary Examiner—Arnold Rosenthal
Attorney, Agent, or Firm—W. W. Ritt, Jr.; Lawrence Cruz; Richard B. Megley

[57] ABSTRACT

The invention is directed to a valve stem double backseat seal wherein the rising stem first engages a nonmetallic radial seal and then axially engages the metal backseat shoulder of the valve bonnet.

15 Claims, 4 Drawing Sheets

FIG_1
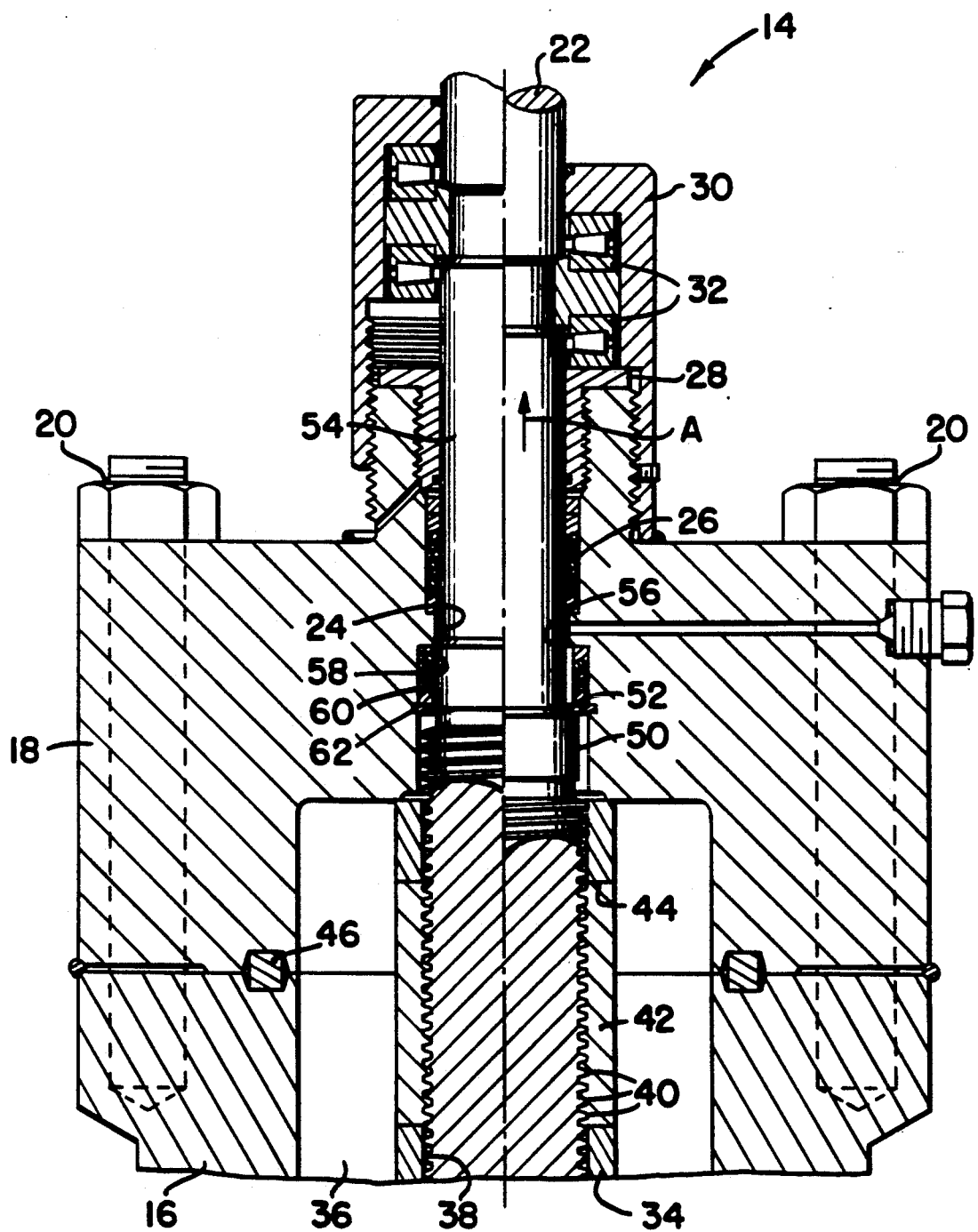

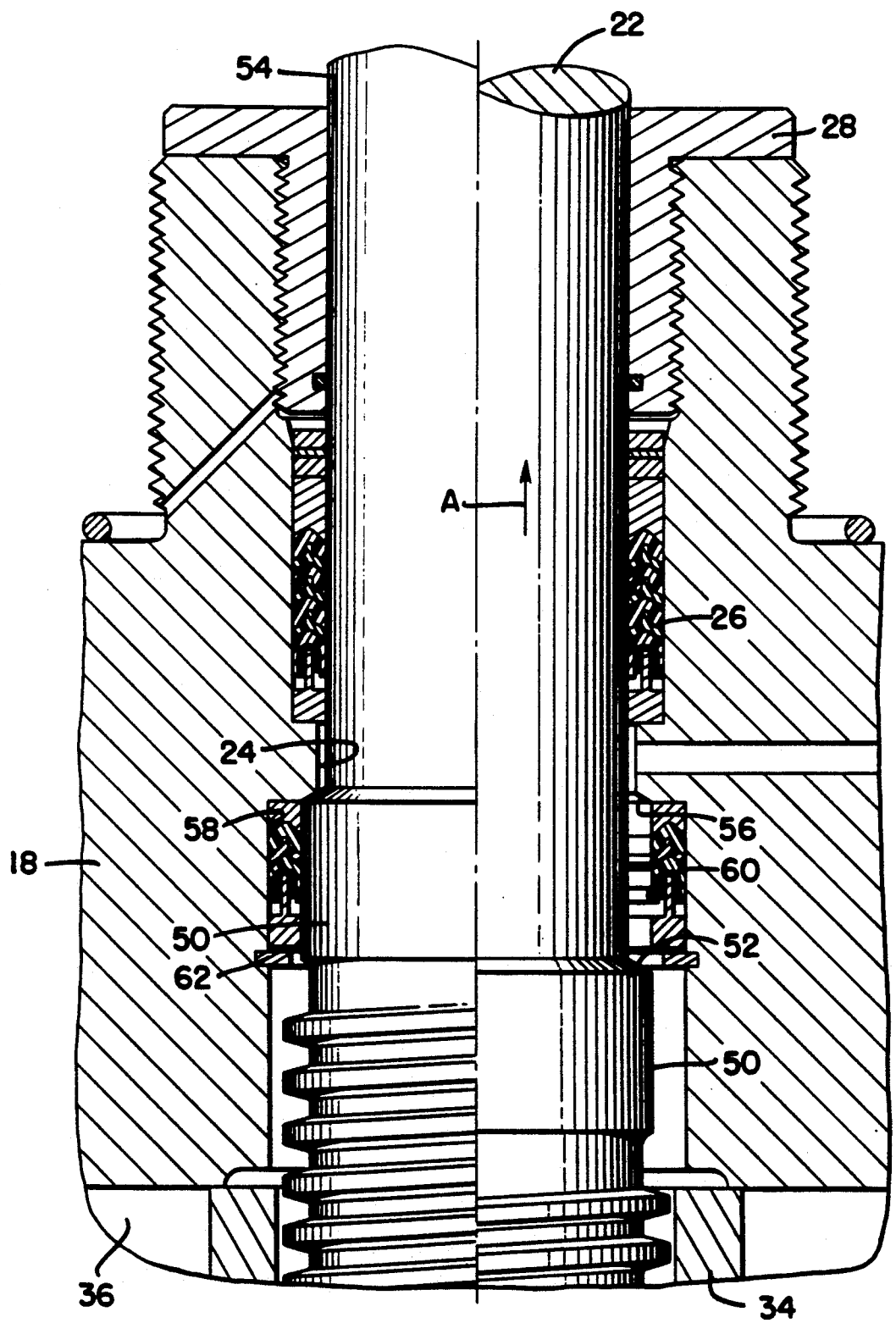
FIG_2

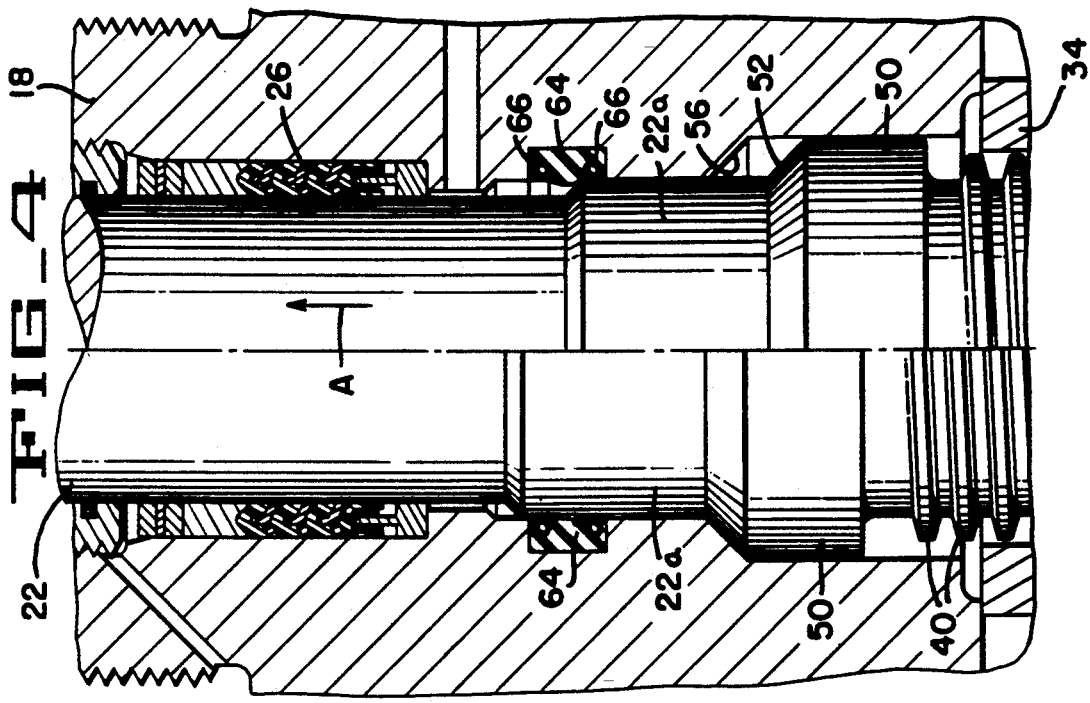
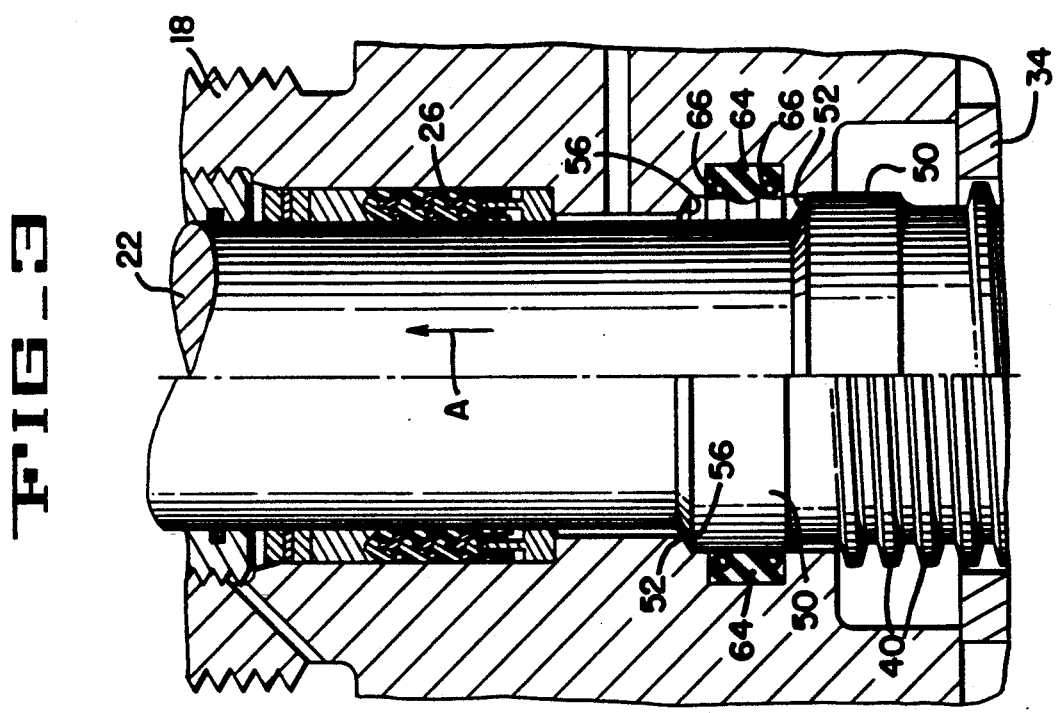

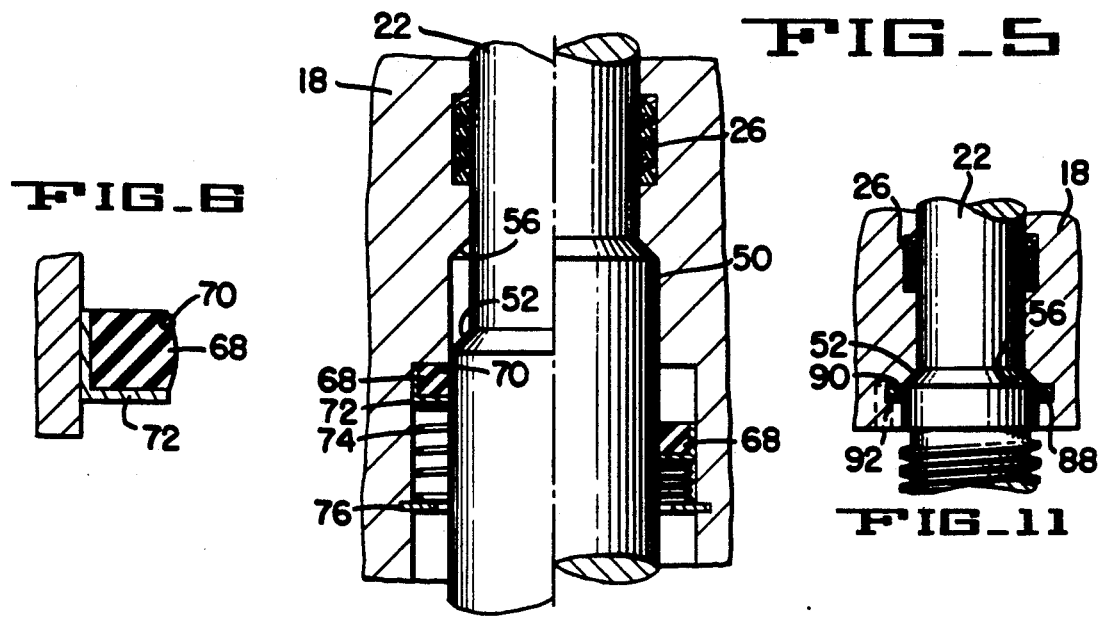
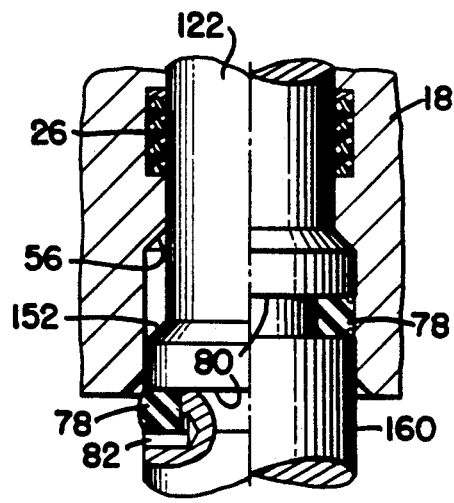
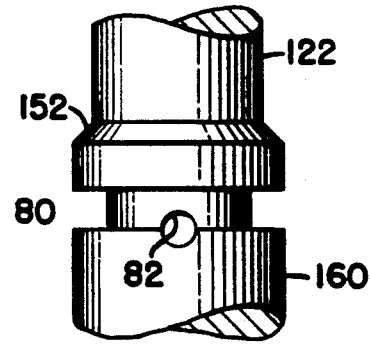
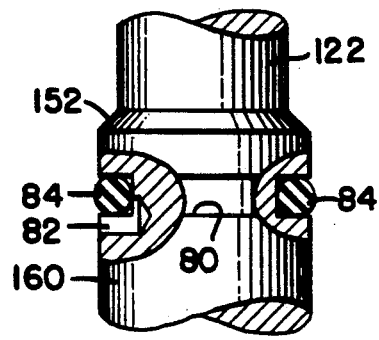
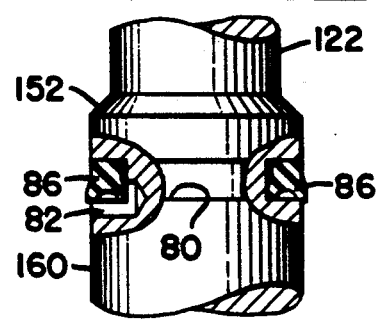

SELECTIVE DOUBLE BACKSEAT FOR VALVE STEMS

BACKGROUND OF THE INVENTION

This invention relates to fluid control valves, and more particularly to gate valves with backseats to establish a pressure seal between the valve stem and valve bonnet.

Selective backseat gate valve designs typically backseat the valve stem against a metallic or non-metallic seal surface in the valve bonnet. This backseat action isolates the stem packing stuffing box from the valve bore pressure and thereby permits replacement of the stem packing while the valve remains pressurized. For improved safety, some valves are designed to mechanically lock the backseat in its engaged position prior to initiation of the stem backing replacement operation. But, this mechanical lock is typically only achievable if the valve is in the fully closed or fully open position, depending upon the specific valve design. If these designs are backseated in any intermediate position, the backseat cannot be mechanically locked in place and may therefore become "deenergized" if the stem is accidentally jarred during the packing replacement operation, whereby leakage will then occur.

SUMMARY OF THE INVENTION

This invention provides for an intrinsically safe valve stem backseat with the valve gate in any position. When the backseat is activated the stem moves outward, first engaging a non-metallic radial seal and then axially engaging the metal backseat shoulder of the valve bonnet. In the event that the stem is disturbed during the primary stem packing replacement operation, a pressure tight seal is assured by the non-metallic backseat packing, which seals with a straight length radial contact rather than an axial face contact.

BRIEF DESCRIPTION OF THE DRAWINGS

FIG. 1 is a fragmentary view in central vertical section of a gate valve embodying the present invention, showing the valve stem in full and backseated on the left of the centerline and not backseated on the right of the centerline.

FIG. 2 is an enlarged fragmentary view of the central portion of FIG. 1.

FIG. 3 is a view like FIG. 2, showing another embodiment of the present invention.

FIG. 4 is a view like FIGS. 2 and 3, showing a third embodiment of the present invention.

FIG. 5 is a fragmentary view like FIGS. 2-4, but on a reduced scale, showing a fourth embodiment of the present invention.

FIG. 6 is an enlarged fragmentary view of the spring supported seal assembly of FIG. 5.

FIG. 7 is a view like FIG. 5, showing a fifth embodiment of the present invention.

FIG. 8 is a side elevation of the valve stem of FIG. 7, showing the one-way vent hole for the stem-mounted seal assembly.

FIG. 9 is a fragmentary side elevation, with portions broken away, of the valve stem of FIGS. 7 and 8, showing another type of elastomeric seal suitable for use in the present invention.

FIG. 10 is a view like FIG. 9, showing a third type of elastomeric seal mounted on the valve stem.

FIG. 11 is a fragmentary view of a valve stem (in full) and a valve bonnet (in central section), showing yet another embodiment of the present invention.

DESCRIPTION OF THE PREFERRED EMBODIMENTS

In reference first to FIGS. 1 and 2, the present invention is illustrated in a non-rising stem gate valve 14 comprising a valve body 16, a valve bonnet 18 secured to the body 16 by a plurality of circumstantially spaced threaded stud and nut assemblies 20, a valve stem 22 located in a bore 24 in the bonnet 18, a stem packing assembly 26 between the stem 22 and the bonnet 18, a packing nut 28 threaded into the top of the bonnet 18 to removably secure the packing assembly 26 in functional position as shown, a bonnet cap 30 threaded onto the bonnet 18, a pair of stem bearing assemblies 32 between the stem 22 and bonnet cap 30, and a valve gate 34 located in the valve chamber 36 formed by the body 16 and bonnet 18. The valve stem 22 extends freely into a central longitudinal bore 38 in the gate 34 and is connected to the gate by means of threads 40 that engage the threaded bore of a gate lift nut 42 which resides in a transverse bore 44 through the upper portion of the gate. In the usual manner an annular seal, such as the metal ring 46, provides a pressure tight seal between the body 16 and the bonnet 18.

The valve stem 22 has an enlarged diameter portion 50 and a frusto-conical backseat portion 52 between the portion 50 and the stem's lesser diameter portion 54. The bonnet bore 24 includes a frusto-conical backseat shoulder 56 and an enlarged diameter portion 58 in which resides a non-metallic seal assembly 60 retained in place by a snap ring 62.

To activate the backseat the bonnet cap 30 is partially unthreaded from the bonnet 18 into the position shown on the left of the centerline in FIG. 1, thereby releasing the stem 22 for axial movement outward, i.e., in the direction of the arrow A, in response to an axial force exerted on it by pressure in th line in which the valve is located and/or an externally applied pull. As the stem 22 moves outward its enlarged diameter portion 50 engages the non-metallic seal assembly 60, thereby establishing a first pressure tight radial seal between the stem and the bonnet 18, and further outward movement of the stem 22 until its backseat portion 52 comes to rest against the bonnet's backseat shoulder 56, establishes a second pressure-tight seal of the stem to the bonnet. This sequential sealing of the stem 22 to the bonnet 18, first through the non-metallic seal assembly 60 and then in a metal-to-metal manner by the cooperation of the backseat portion 52 and the backseat shoulder 56, assures that the stem packing 26 can be serviced or replaced while the pressure in the valve chamber 36 is safely maintained.

Since the stem 22 does not move axially during rotation thereof to translate the valve gate 34 between its open and closed positions, this invention facilitates the safe backseating of the stem with the valve gate in any position, i.e., fully open, fully closed, and any intermediate position. Once the first stem-to-bonnet backseat seal is established through the non-metallic seal assembly 60 this straight length radial contact seal is maintained for the remainder of outward movement of the stem, and when the stem backseat 52 comes to rest against the bonnet shoulder 56 to form the metal-to-metal seal between the stem and bonnet a dual backseating of the stem results.

The embodiment of the invention illustrated in FIG. 3 is fundamentally the same as that of FIGS. 1 and 2, except that an annular non-metallic seal element 64 with helically-coiled anti-extrusion rings 66 is used instead of the seal assembly 60 to provide the non-metallic radial backseat seal between the stem 22 and bonnet 18.

The FIG. 4 embodiment of the present invention involves the same seal element 64 and anti-extrusion rings 66 as in FIG. 3, but these components are positioned in the bonnet bore outward of the bonnet backseat shoulder 56, to cooperate with an intermediate diameter stem portion 22a to establish the non-metallic radial backseat sealing of the stem to the bonnet.

In the embodiment shown in FIGS. 5 and 6 the non-metallic radial backseat seal between the stem 22 and bonnet 18 is provided by an annular non-metallic seal element 68 with an anti-extrusion ring 70. The seal element 68 is supported by an annular rigid retainer 72 of L-shaped cross-section that is biased outward by a helical spring 74 surrounding the stem 22 and secured in place by a snap-ring 76. As the valve stem 22 moves outward the spring loaded seal 68 moves axially inward from its initial backseat position shown at the left in FIG. 5 towards its position shown at the right of FIG. 5, to compensate for displaced fluid volume that is trapped between this seal and the stem packing 26.

As illustrated in FIG. 7, the initial backseat seal can be provided by a non-metallic seal ring 78 carried in an radial groove 80 in the enlarged diameter portion 160 of the valve stem 122. A one-way vent hole 82 intersecting the groove 80 functions to allow fluid trapped between the seal ring 78 and the stem packing 26 to escape past the ring 78 as the stem 122 moves outward to establish the metal-to-metal seal between the bonnet shoulder 56 and the stem backseat 152, thereby preventing any tendency of hydraulic locking to develop.

An elastomeric O-ring 84 (FIG. 9) or a non-metallic ring 86 (FIG. 10) of other cross-sectional configuration can be used in lieu of the ring 78 (FIG. 7) on the valve stem 122 if such is desired.

As represented in FIG. 11, an elastomeric O-ring 88 can be positioned in an annular groove 90 in the bore of the bonnet 18 to provide non-metallic radial backseating of the stem 22 to the bonnet, and a one-way vent hole 92 intersecting the groove 90 will prevent hydraulic pressure build-up between the O-ring and the stem packing 26 as the stem 22 moves outward to engage the bonnet backseat shoulder 56. Such a one-way vent hole also can be included in the other embodiments of the present invention where the possibility of hydraulic locking is or could be present.

Although various types of seal assemblies can be used for the seal assembly 60, the preferred assembly is that described in Ungchusri et al U.S. Pat. No. 4,527,806, issued Jul. 9, 1985, the contents of which is hereby incorporated by reference. As will be understood, that seal assembly comprises (a) at least one seal ring element having a generally V-shaped cross-sectional configuration, (b) at least one backup/energizing ring in supportive relationship with the seal ring element and having a generally Y-shaped cross-sectional configuration, (c) a lip seal ring having a central base and at least one sealing lip extending therefrom, and (d) an adapter ring having a generally T-shaped cross-sectional configuration and in supportive relationship with the lip seal ring.

Although the best mode contemplated for carrying out the present invention has been herein shown and described, it will be apparent that modification and variation may be made without departing from what is regarded to be the subject matter of the invention.

We claim:

1. A fluid flow control valve comprising a body with a valve chamber, a bonnet with a bore communicating with the chamber, a valve closure element in the chamber, and a valve stem connected to the valve closure element and extending through the bonnet bore, said valve further comprising
   a) first means for backseating the valve stem on the bonnet to provide a pressure seal between said stem and bonnet, and
   b) second means for backseating the valve stem on the bonnet, said second backseating means located to provide an initial radial pressure seal between the stem and the bonnet as the stem is moved axially to establish the pressure seal provided by the first backseating means.

2. A valve according to claim 1 wherein the first backseating means comprises a metallic seal element that cooperates with the bonnet to establish a metal-to-metal seal between the stem and the bonnet.

3. A valve according to claim 2 wherein the metallic seal element comprises an annular flange on the valve stem.

4. A valve according to claim 3 wherein the annular flange has a frusto-conical surface that cooperates with a frusto-conical surface on the bonnet to provide said metal-to-metal seal.

5. A valve according to claim 1 wherein the second backseating means comprises a radial seal element surrounding the stem between the valve closure element and the first backseating means.

6. A valve according to claim 5 wherein the radial seal element is non-metallic.

7. A valve according to claim 5 wherein the radial seal element is mounted in the bonnet.

8. A valve according to claim 5 wherein the radial seal element is located in an annular groove on the stem.

9. A valve according to claim 1 wherein the second backseating means is spring-biased towards the first backseating means to prevent hydraulic lock of the stem to the bonnet.

10. A valve according to claim 1 wherein the second backseating means comprises an annular non-metallic seal assembly.

11. A valve according to claim 10 wherein the non-metallic seal assembly is mounted in the bonnet.

12. A valve according to claim 10 wherein the non-metallic seal assembly comprises
   a) at least one seal ring element having a generally V-shaped cross-sectional configuration,
   b) at least one backup/energizing ring in supportive relationship with the seal ring element and having a generally Y-shaped cross-sectional configuration,
   c) a lip seal ring having a central base and at least one sealing lip extending therefrom, and
   d) an adapter ring having a generally T-shaped cross-sectioned configuration and in supportive relationship with the lip seal ring.

13. A valve according to claim 1 including vent means in communication with the second backseating means to prevent hydraulic lock between the stem and the bonnet.

14. A valve according to claim 13 wherein the vent means comprises a passageway in the stem.

15. A valve according to claim 13 wherein the vent means comprises a passageway in the bonnet.

* * * * *